US010191998B1

(12) United States Patent
Burkhardt

(10) Patent No.: US 10,191,998 B1
(45) Date of Patent: Jan. 29, 2019

(54) METHODS OF DATA REDUCTION FOR PARALLEL BREADTH-FIRST SEARCH OVER GRAPHS OF CONNECTED DATA ELEMENTS

(71) Applicant: The United States of America as represented by the Director, National Security Agency, Washington, DC (US)

(72) Inventor: Paul Burkhardt, North Potomac, MD (US)

(73) Assignee: The United States of America, as represented by the Director, National Security Agency, Washington, DC (US)

( * ) Notice: Subject to any disclaimer, the term of this patent is extended or adjusted under 35 U.S.C. 154(b) by 189 days.

(21) Appl. No.: 15/263,748

(22) Filed: Sep. 13, 2016

(51) Int. Cl.
*G06F 17/30* (2006.01)
*G06F 13/364* (2006.01)

(52) U.S. Cl.
CPC ...... *G06F 17/30958* (2013.01); *G06F 13/364* (2013.01); *G06F 17/3033* (2013.01); *G06F 17/30336* (2013.01); *G06F 17/30377* (2013.01)

(58) Field of Classification Search
CPC ......... G06F 17/30958; G06F 17/30377; G06F 17/3033; G06F 13/364; G06F 17/30336
See application file for complete search history.

(56) References Cited

U.S. PATENT DOCUMENTS

| 9,223,554 | B1 | 12/2015 | Lawson |
| 2003/0033582 | A1* | 2/2003 | Klein ............... G06F 17/30958 |
| | | | 716/136 |
| 2006/0287842 | A1 | 12/2006 | Kim |
| 2007/0136326 | A1 | 6/2007 | McClement et al. |
| 2008/0143723 | A1 | 6/2008 | Zhou |
| 2011/0307685 | A1* | 12/2011 | Song ..................... G06F 17/10 |
| | | | 712/16 |
| 2013/0003730 | A1* | 1/2013 | Tajima .................. H04L 45/12 |
| | | | 370/389 |

(Continued)

OTHER PUBLICATIONS

Munagala, K. et al.; I/O—Complexity of Graph Algorithms; Symposium on Discrete Algorithms; pp. 687-694; 1999.

(Continued)

*Primary Examiner* — Ashish Thomas
*Assistant Examiner* — Aryan D Toughiry

(57) ABSTRACT

A method includes receiving, at a master controller, a matrix representing a graph and a first vector, and initializing a counter variable and an array to track dimensionality reduction for the matrix. The method also includes multiplying a subset of the matrix based on the counter variable, by a subset of the first binary vector based on the counter variable. Multiplying includes providing, the vector and a matrix portion to a first processor, and the vector and another portion of the matrix to a second processor. The method also includes, at the processors, multiplying the vectors by the portions of the matrix and returning the results. The method also includes combining the results at the master controller. The method also includes incrementing the counter variable and updating the tracking array for larger dimensionality reduction of the matrix. The method also includes constructing the logical pathway based on the tracking array.

5 Claims, 12 Drawing Sheets

(56) References Cited

U.S. PATENT DOCUMENTS

| | | | |
|---|---|---|---|
| 2013/0019215 A1* | 1/2013 | Swann | G06F 17/505 |
| | | | 716/102 |
| 2014/0037227 A1 | 2/2014 | Zhang et al. | |
| 2014/0118355 A1* | 5/2014 | Vassilvitskii | G06T 11/206 |
| | | | 345/440 |
| 2014/0136468 A1 | 5/2014 | Faratin et al. | |
| 2014/0280813 A1* | 9/2014 | Ramachandran | H04L 67/14 |
| | | | 709/223 |
| 2015/0095182 A1* | 4/2015 | Zhou | G06Q 30/0631 |
| | | | 705/26.7 |
| 2015/0293994 A1 | 10/2015 | Kelly | |
| 2017/0034268 A1* | 2/2017 | Govind | H04L 67/1097 |

OTHER PUBLICATIONS

Burkhardt, P. et al.; A Cloud-based Approach to Big Graphs; in Proceedings of the 19th Annual IEEE Conference on High Performance Extreme Computing; pp. 1-8, 2015; DOI: 10.1109/HPEC/2015.7396313.

* cited by examiner $$301 \rightarrow \begin{pmatrix} 0 & 1 & 0 & 1 & 0 & 0 \\ 1 & 0 & 1 & 0 & 0 & 0 \\ 0 & 0 & 1 & 0 & 0 & 1 \\ 0 & 0 & 0 & 1 & 1 & 0 \\ 0 & 0 & 0 & 0 & 0 & 1 \\ 0 & 0 & 0 & 0 & 1 & 0 \end{pmatrix}$$

FIG. 3A

FIG. 3B $$nz = (1\ 1\ 1\ 1\ 1\ 1\ 1\ 1)$$
$$col = (4\ 5\ 3\ 4\ 2\ 5\ 0\ 1)$$
$$row = (0\ 1\ 2\ 4\ 6\ 8\ 10)$$

FIG. 9

METHODS OF DATA REDUCTION FOR PARALLEL BREADTH-FIRST SEARCH OVER GRAPHS OF CONNECTED DATA ELEMENTS

FIELD OF INVENTION

The present invention relates, in general, to methods of minimizing information in the Breadth-First Search processing of graph data, and in particular, to methods of searching and inducing subgraphs in large data sets efficiently using parallel processors.

BACKGROUND OF THE INVENTION

Since its discovery in the 1950s, Breadth-First Search (BFS) has been used to traverse graphs, progressing from a source vertex by expanding a neighborhood around unique vertices encountered at the same distance from the source vertex. Because numerous types of data can be modeled as graph data structures, various data structures and computing architectures have been used to create various implementations of BFS for different applications. Computational considerations have included total space and time required to perform the search. Time/space tradeoffs have also implicated cost tradeoffs of providing larger random-access memories at greater cost, or utilizing cheaper, disk-based storage, but at a significant time penalty for each access. Some implementations have also included parallel processing techniques, where greater upfront cost for processing hardware and inter-processor communication overhead are accepted in return for increased processing speed.

SUMMARY

One embodiment of the present invention is a computer-implemented method of constructing a logical pathway between an initial search frontier and a target data element in an undirected graph of data elements. The method is performed in a system including 1) a plurality of parallel processors each having a local memory, 2) an inter-processor communication (IPC) network, and 3) a master controller having a local memory and logically coupled to the plurality of parallel processors via the IPC network. The method includes receiving, at the master controller in the local memory, a data structure defining a symmetric matrix having size n×n. The value of each matrix element corresponds to one of 1) a presence of, and 2) an absence of, an undirected edge between a pair of data elements in the graph of data elements defined by a row and a column of the matrix element. The method also includes receiving, at the master controller in the local memory, a first vector of length n. The value of each element in the vector corresponds to one of 1) a presence of, and 2) an absence of, a data element of the graph of data elements in the initial search frontier. The method also includes, at the master controller in the local memory, initializing 1) a counter variable and 2) a tracking array. The tracking array contains array elements that are configured to track dimensionality reduction parameters for the matrix. The method also includes repeatedly performing the following operations. The operations include multiplying a subset of the matrix defined by the array element corresponding to the counter variable, by a subset of the first vector defined by the array element corresponding to the counter variable, to generate a second vector corresponding to an updated search frontier corresponding to the counter variable. Multiplying the subset of the matrix by the subset of the first vector includes providing, from the master controller via the IPC network to a first processor of the plurality of parallel processors, the first vector and at least one first portion of the matrix. Multiplying also includes, at the first processor in the first processor's local memory, multiplying the first vector by the at least one first portion of the matrix to produce a first result. Multiplying also includes providing, from the first processor via the IPC network to the master controller, the first result. Multiplying also includes providing, from the master controller via the IPC network to a second processor of the plurality of parallel processors, the first vector and at least one second portion of the matrix. Multiplying also includes, at the second processor in the second processor's local memory, multiplying the first vector by the at least one second portion of the matrix to produce a second result. Multiplying also includes providing, from the second processor via the IPC network to the master controller, the second result. Multiplying also includes combining, at the master controller in the local memory, the first result and the second result. The operations also include incrementing the counter variable and updating an array element in the tracking array corresponding to the counter variable based on the non-zero values of the first binary vector, such that the updated array element corresponds to a larger dimensionality reduction of the matrix than the previously used array element. The operations are performed until 1) the updated search frontier contains a non-zero element corresponding to the target data element, or 2) the matrix is reduced to a minimum dimension. The method also includes constructing the logical pathway based on the tracking array.

Another embodiment of the present invention is a computer-implemented method of constructing a subgraph of an undirected graph of data elements based on a target data element in the graph. The method is performed in a system including 1) an inter-processor communication (IPC) network, 2) a plurality of parallel processors each having a local memory and logically coupled to the IPC network, 3) a master controller having a local memory and logically coupled to the IPC network, and 4) at least one persistent physical storage system logically coupled to the IPC network. The method includes repeatedly updating the subgraph, until the subgraph is updated based on the target data element. The subgraph is updated by performing the following operations. The operations include receiving, at the master controller in the local memory, a data element of the graph, and determining, at the master controller, a hash value of the data element. The operations also include providing the data element via the IPC network to a parallel processor of the plurality of parallel processors. The parallel processor is selected based on the hash value. The operations also include providing a distance value associated with the data element, via the IPC network to the parallel processor and determining, at the parallel processor, whether the first distance value associated with the data element is two more than at least one previously observed distance value associated with the data element. The operations also include, in the event the distance value does not differ from any previously observed distance value, processing the data element by performing an element expansion operation. The element expansion operation includes requesting, from the at least one persistent physical storage system, at least one subsequent element of the undirected graph based on the data element. The element expansion operation also includes associating a subsequent distance value with the at least one subsequent element, the subsequent distance value being one greater than the distance value associated with the data element. The element expansion operation also includes providing the at least one subsequent element of the undirected graph and its associated distance value, as well as the data element and its associated distance value to the master controller via the IPC network and updating the subgraph, at the at least one persistent physical storage system, based on the at least one subsequent element. The operations also include, in the event the distance value is two more than at least one previously observed distance value, marking the at least one subsequent element for deletion based on the second distance value and the at least one previously observed distance value.

BRIEF DESCRIPTION OF THE DRAWINGS

FIG. 3A is a diagram showing a matrix representation of the graph of FIG. 2.

FIG. 3B illustrates a matrix multiplication operation using the matrix of FIG. 3A, in accordance with an embodiment of the present invention.

FIG. 9 is a diagram showing another representation of the graph of FIG. 2.

DETAILED DESCRIPTION

Figure 1:
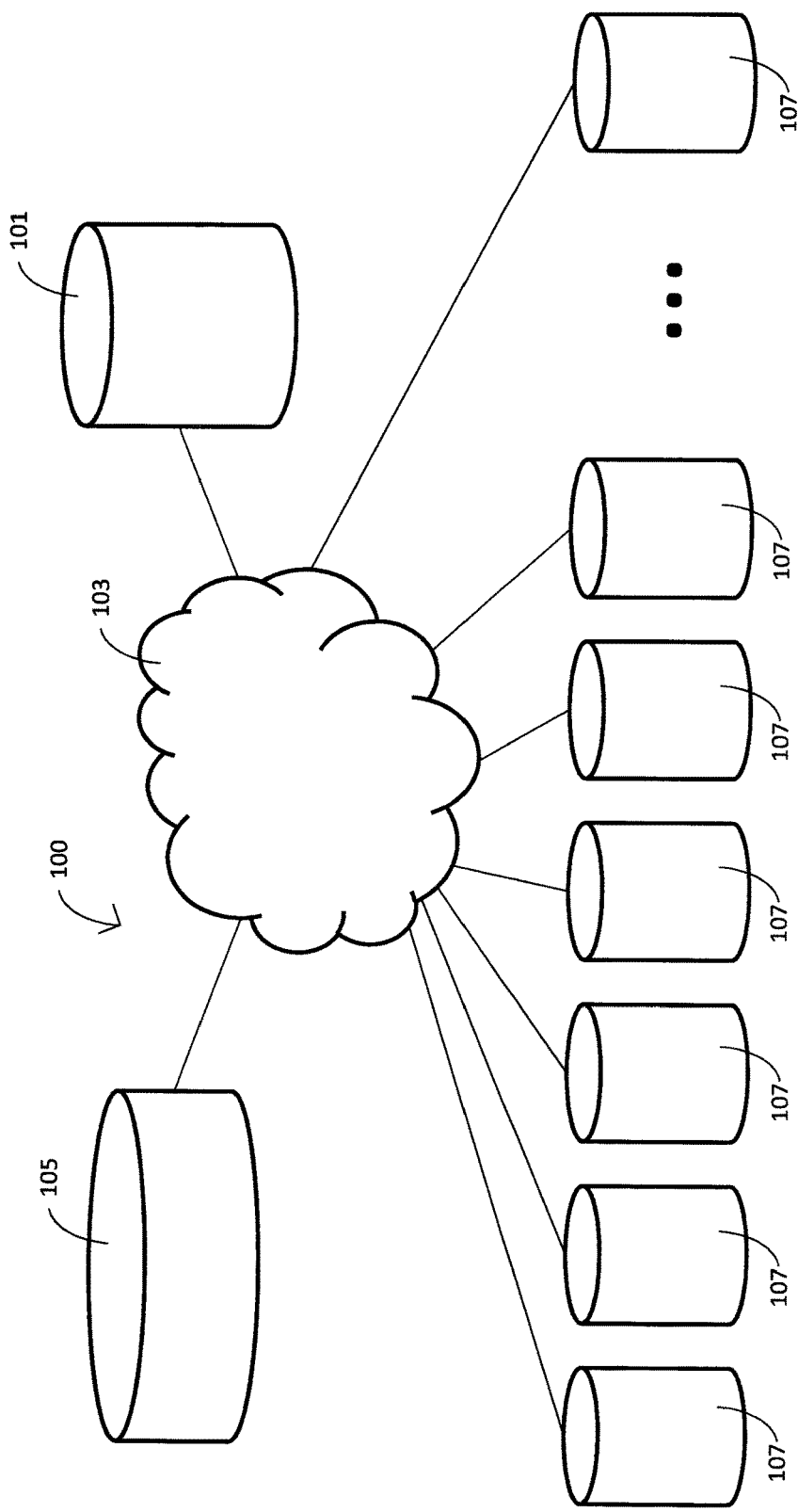
FIG. 1 is a diagram illustrating a computing architecture in accordance with an embodiment of the present invention.

FIG. 1 is a diagram illustrating a computing architecture 100 in accordance with an embodiment of the present invention. A master controller 101 is provided, which will serve as a central controlling node in the larger parallel processing architecture. The master controller has a local memory for storing data and instructions. The master controller 101 is connected to an interprocessor-communication (IPC) network 103. Also connected to the IPC network 103 is a database 105 which contains data in persistent disk-based storage. The data have defined relationships such that they can be represented logically as an undirected graph, such as shown in the simplified examples in FIGS. 2 and 4. In practice, the graph may include very large numbers of nodes and very large numbers of edges between the nodes. In certain embodiments, the graph is sufficiently large that it may be impractical or impossible to load more than a small subset of the complete graph into a conventional memory structure, such as the local memory of the master controller 101.

Also connected to the IPC network 103 are a plurality of parallel processors 107. Each of the parallel processors 107 has its own local memory and is configured to communicate through the IPC network 103 to any of the database 105, the master controller 101, and other parallel processors 107. The computing architecture 100 may be implemented as an integrated system, such as a multi-core computer with various data buses and hard disks. Alternatively, the computing architecture 100 may be implemented as a partially distributed or fully distributed architecture, where the various components of the computing architecture 100 are not necessarily physically collocated, and the parallel processors 107 may instead be a collection of remote computer terminals connected via the internet.

Figure 2:
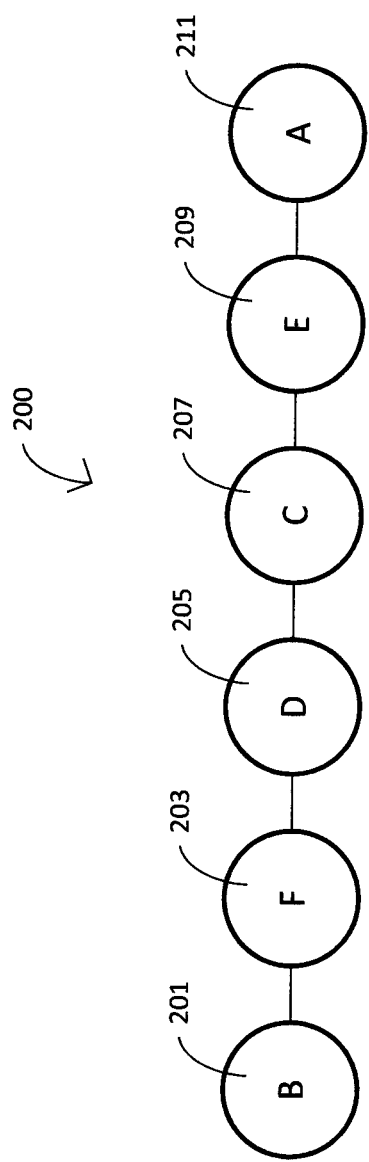
FIG. 2 is a diagram showing a graph of linearly-connected data elements.

FIG. 2 is a diagram showing a graph 200 of linearly-connected data elements. The exemplary graph 200 is provided merely to illustrate the mechanics of the presently disclosed methods in a clear fashion; practical applications may include graphs having at least thousands or millions of nodes, which may have large numbers of edges connected to individual nodes. Additionally, graphs in practical applications may include multiple connected components, and fast, efficient identification of such separate sets is one of the contemplated applications of the presently disclosed methods. In the present example, the graph 200 includes six nodes. The node 201 labeled "B" is connected to the node 203 labeled "F," which is connected to the node 205 labeled "D." This node 205 is in turn connected to the node 207 labeled "C," which is connected to the node 209 labeled "E," which is connected to the node 211 labeled "A." The edges between nodes are undirected, so that one could equally have read the graph from right to left, instead of from left to right as was done in the description above. Significantly, it also is possible to begin traversing the graph beginning at any of the six nodes, and not only the "end" nodes 201, 211. The underlying data structure could be, for example, implemented with a doubly-linked list. Alternatively, elements could be stored in data locations based on a hash value of the key of the node, i.e., node 201 is stored in a location determined by the hash of "B," node 203 is stored in a location determined by the hash of "F," and so on. The links between elements could be implemented by storing the keys themselves, i.e., node 201 is stored together with the value "F," node 203 is stored together with the values "B" and "D," and so on. Alternatively, the hash values could be stored locally, instead of the key values. Various other implementations may be used according to the preferences of those skilled in the art, as well. Various techniques exist that may be used to assign the elements of the graph to the rows and columns of an adjacency matrix as used in presently described embodiments. Similarly, a list of edges may be used to fully describe the graph.

FIG. 3A is a diagram showing a matrix 301 representation of the graph of FIG. 2. According to this matrix 301 representation, each node of the graph has a different index associated with it, such that each row and column of the matrix 301 is uniquely associated with a particular node. Here, for the sake of clarity, the values of the nodes shown in FIG. 2 are shown as consecutive letters, such that "A" corresponds to the first row (and also to the first column) of the matrix 301, "B" corresponds with the second, and so on. A value of zero at a given coordinate of the matrix 301 indicates the absence of an edge in the graph between two nodes, whereas a value of one at a given coordinate of the matrix 301 indicates the presence of an edge in the graph between those two nodes. For example, in the first row, at the top of the matrix 301, in the fifth column from the left, there is a 1, meaning that the fifth element and the first element are connected by an edge. This can be confirmed with reference to FIG. 2, which shows that node 209 ("E") is connected to node 211 ("A"). Similarly, in the first, leftmost column, at the fifth row from the top, there also is a 1.

Figure 9:
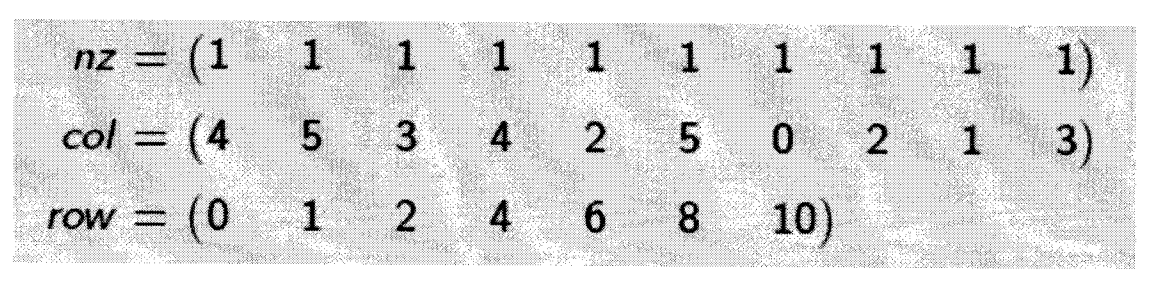

The matrix 301 also may be stored in various formats. The matrix data may be stored in conventional sequential array storage, for example. In the situation where a large number of elements are zero, however, it may be more space-efficient to use a different format, such as compressed sparse row (CSR). The matrix of FIG. 3A can be seen in CSR format in FIG. 9. All nonzero ("nz") values are 1 in the present case, and the following two arrays, "col" and "row," indicate the columns where the non-zero values occur, and the indices in "nz" for the first non-zero value of each row, respectively.

Figure 3B:
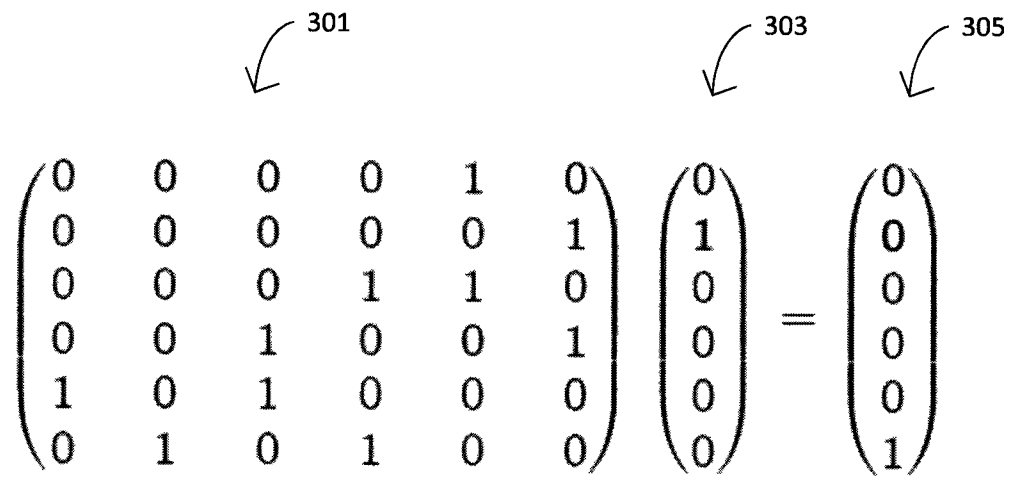

FIG. 3B illustrates a matrix multiplication operation using the matrix of FIG. 3A, in accordance with an embodiment of the present invention. A search frontier may be represented by a binary vector, such as vector 303, which represents a search frontier containing only node 201. Expansion of the search frontier can then be performed by multiplying the matrix 301 by the vector 303, which gives vector 305. Since only non-zero elements in matrix 301 can induce non-zero elements in vector 305, vector 305 will contain the new search frontier, in this case, node 203. It is possible to repeat this operation as many times as desired by multiplying the matrix 301 by each successive frontier vector until a frontier vector is generated having a non-zero value in the position corresponding to a target element of the graph that the search is attempting to find. Eventually, every element in a connected component together with at least one element of the search frontier will be traversed. Because the size of the matrix 301 is constant and each successive frontier vector has the same size, no additional memory is needed for these operations beyond that which is sufficient for the first round of multiplication. Storage of the intermediate search frontier vectors, which may be desired if it is necessary to determine not only the existence of an element in a connected component, but the path from the initial search frontier to the target element, can be performed in persistent disk storage, such as in the database 105 shown in FIG. 1.

Figure 3C:
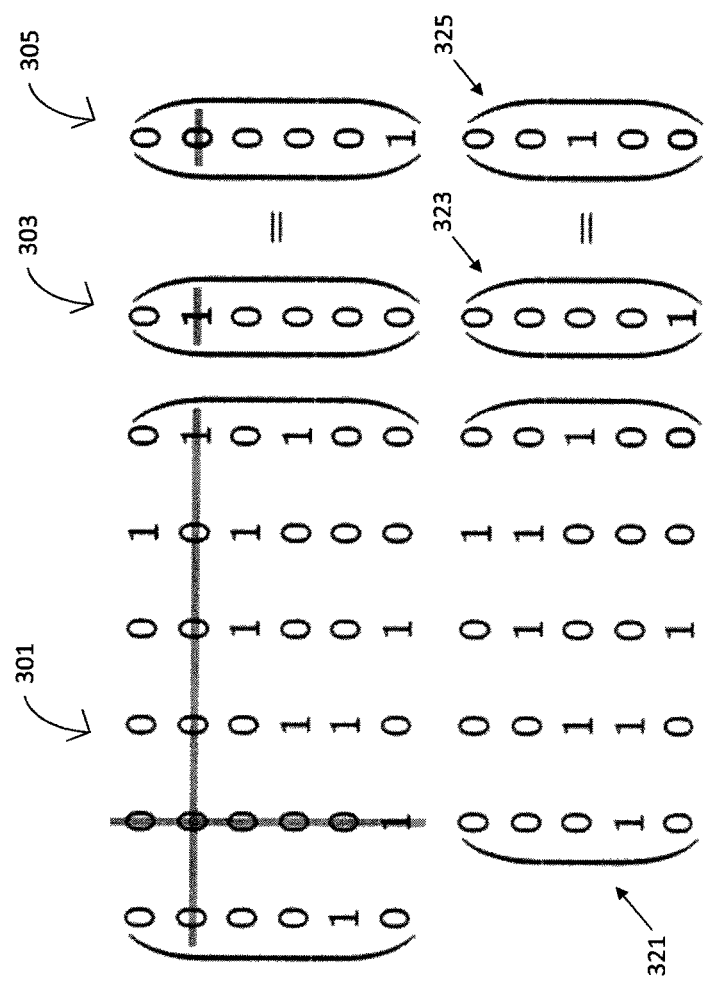
FIG. 3C illustrates the effect of a dimensionality reduction corresponding to the matrix multiplication operation of FIG. 3B, in accordance with an embodiment of the present invention.

Multiplying one n-length vector by an n×n matrix requires $n^2$ steps. Therefore, completely traversing a graph by repeatedly performing the calculation shown in FIG. 3B requires $O(n^3)$ time. The full $n^3$ steps will be necessary for a graph such as graph 200 in FIG. 2, where precisely one new node is traversed at each multiplication. FIG. 3C illustrates the effect of a dimensionality reduction corresponding to the matrix multiplication operation of FIG. 3B, in accordance with an embodiment of the present invention. Complete traversal of a graph by methods involving the dimensionality reduction disclosed herein is accelerated significantly. Rather than requiring $O(n^3)$ time to search a graph with n nodes, the time is reduced to $O(n^2)$. While the first matrix multiplication uses $n^2$ operations as before, each successive multiplication is performed using a matrix and vector having smaller size, and thus taking less time than the previous round. In sparse matrix representations such as CSR the calculations take $O(n+m)$ time, where m is the number of edges in the graph, using dimensionality reduction as opposed to $O(n^2)$ time, thus the methods described herein enable linear-time performance, in contrast to the quadratic-time approaches of the prior art. Because the matrix 301 is symmetric, additional efficiency in the computation may be gained by noting that half of the matrix is enough to fully define the matrix, and half of the computation may be avoided accordingly.

Dimensionality reduction exploits the fact that once a particular node is expanded as part of a search, there is no need to revisit that node. In accordance with embodiments of the present invention, when a node is expanded, the dimensions of the matrix 301 and successive frontier vectors are reduced so as to avoid performing any further calculations relating to that node. In the present example, the initial frontier vector 303 has exactly one non-zero element, namely, the second element, corresponding to the value "B," which is node 201 of FIG. 2. Upon performing the initial multiplication, one or more hash tables, arrays, or similar data structures can be updated to mark the particular element(s) that were expanded as excluded from further calculations. This is represented in FIG. 3C by the line through the second element of vector 303. The matrix 301 is thus effectively reduced to matrix 321, having dimensions 5×5, rather than the original 6×6. This reduction is represented visually by the lines through the second row and column of matrix 301.

Note that this dimensionality reduction does not actually require the construction of a new data structure arranged according to 5×5 dimensions. Rather, the multiplication functions employed may be configured to consult the hash table to determine which matrix and vector elements are to be processed as part of a multiplication operation and which are not. While it is indeed possible to recreate the matrix in a new data structure, this copying step requires time and space itself, and tends to be less efficient. Similarly, the updated frontier vector 323 also will have the same reduced dimension; this reduction of dimension is represented visually by the line through the second element of vector 305. Conceptually, the elements of the reduced vector 323 now represent graph elements "A," "C," "D," "E," and "F," in that order, because element "B" has been removed. Thus we see that expansion of element "F," node 203, gives us vector 325, having a sole non-zero element in the third position. As just noted, the third position now corresponds to "D," and so it has been established that "F," node 203, has an edge connecting to "D," node 205.

Figure 3D:
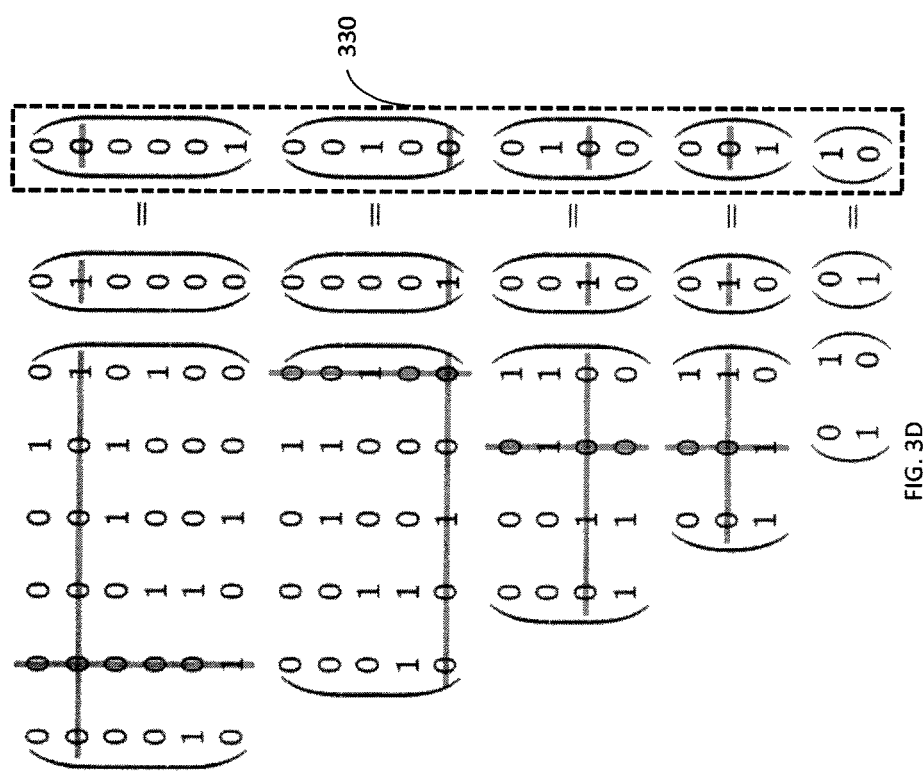
FIG. 3D illustrates the effect of a repeated dimensionality reduction, continuing the operation of FIG. 3C, in accordance with an embodiment of the present invention.

FIG. 3D illustrates the effect of a repeated dimensionality reduction, continuing the operation of FIG. 3C, in accordance with an embodiment of the present invention. So long as there remain nodes to traverse in the present connected component(s) of a graph, the frontier vector will have at least one non-zero value at each iteration. Accordingly, the dimension of the matrix and vector will decrease at each iteration. In practice, many graphs will have nodes with multiple edges connected to them, and possibly a very large number of edges. Thus, reducing the dimension of the calculation by one, as in the illustrated example, is a worst-case scenario, and the expectation is generally for a much faster reduction, leading to much more significant speedup.

FIG. 3D shows conceptually how this computation would progress as graph 200 is traversed from node 201 to node 211, and the series of result vectors generated during the course of the search can be seen, running from top to bottom, in box 330. This traversal could occur because node 201 was selected as the starting node and "A" at node 211 was selected as the target element. Similarly, a search initiated from node 201 could be made to search for an "un-element," or a null element, defined such that any comparison to the frontier will always result in a determination that the "target" element has not been found. In such an implementation, the search would continue until no further nodes remain unexplored. In other cases, a search may be limited ahead of time to a certain number of degrees of branching. In one example, it may be desired to determine whether a target node can be reached in at most 6 hops from a starting node. Suppose that a starting node has a value of "Kevin Bacon," and edges represent appearing together in a film; performing this bounded search for actor "John Doe" over a graph representing movie metadata would answer the question of whether "John Doe" is within six degrees of Kevin Bacon, based on whether or not "John Doe" appears in the frontier vector before 6 rounds of expansion have occurred. In another example, a graph of map data, such as in a GPS navigation system, may be traversed to determine a shortest path from a starting location to a desired destination. In such an application, the graph could use weighted edges to represent distance between locations, obstructions and expected delays, etc., which could in turn cause the matrix to have values other than 1.

Figure 5:
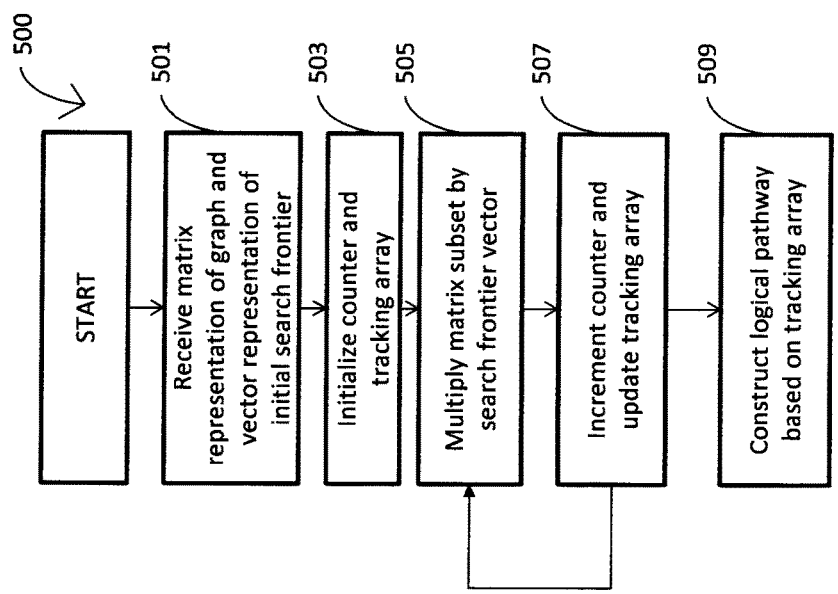
FIGS. 5-8 are flow charts illustrating methods in accordance with various embodiments of the present invention.

A process in accordance with an embodiment of the present invention is now described with reference to FIG. 5. FIG. 5 is a flow chart illustrating the process 500. The process 500 begins at block 501, where a matrix representation of a graph is received, and a vector representation of an initial search frontier is received. Both of these data structures may be received in a master controller of a parallel processing architecture, such as the architecture 100 shown in FIG. 1. The matrix representation of the graph may be a square, n×n symmetric binary matrix, such as shown in the exemplary matrix 301 of FIG. 3A. The matrix may be stored using a data structure that is optimized for retrieving individual rows, so that the rows may be efficiently distributed to separate parallel processors for efficient computation. The initial frontier may represent a single node in the graph, for example, such as when a tree is to be searched beginning from a root node, or when a local neighborhood around a particular element in a graph is to be explored. However, the initial frontier also may include multiple nodes, based on the desired application.

The process continues at block 503, where a counter variable and a tracking array are initialized. These both may be initialized at the master controller 101. The counter variable corresponds to a depth of the search, i.e., how many rounds of node expansion have been performed. The tracking array is used to track which rows and columns of the matrix and vector should be included in or excluded from any particular matrix multiplication. In some implementations, the tracking array may include a hash table or an array of hash tables. The counter variable may be used as an index into the tracking array. The tracking array can be initialized with all n indices, corresponding to all vertices. During operations, the indices can be marked or deleted so as to effectively ignore the indices, thereby reducing the dimensions of the calculations. While blocks 501 and 503 are presented here sequentially, both describe initialization activities that may be performed in any desired order or simultaneously.

The process continues at block 505, where a subset of the matrix is multiplied by a corresponding subset of the frontier vector. The presently described exemplary embodiment implements a matrix multiplication by direct row multiplication, with each row being selected for processing at a chosen parallel processor. In various embodiment, other implementations are possible as well, such as, e.g., use of CSR matrix representations. The counter variable and the tracking array may define the specific subsets to be used. For example, the counter variable may index the tracking array, referring to a particular hash table, where the hash table defines the subset of the matrix upon which to multiply. The result of the multiplication will be an updated frontier vector, having elements defined over the same dimensions as were used for the matrix and frontier vector in the present round of multiplication. In the first instance, the subset may be a subset of the whole, i.e., nothing is excluded. In each round that will follow, however, the subset used will be a proper subset of the previously used subset.

Figure 6:
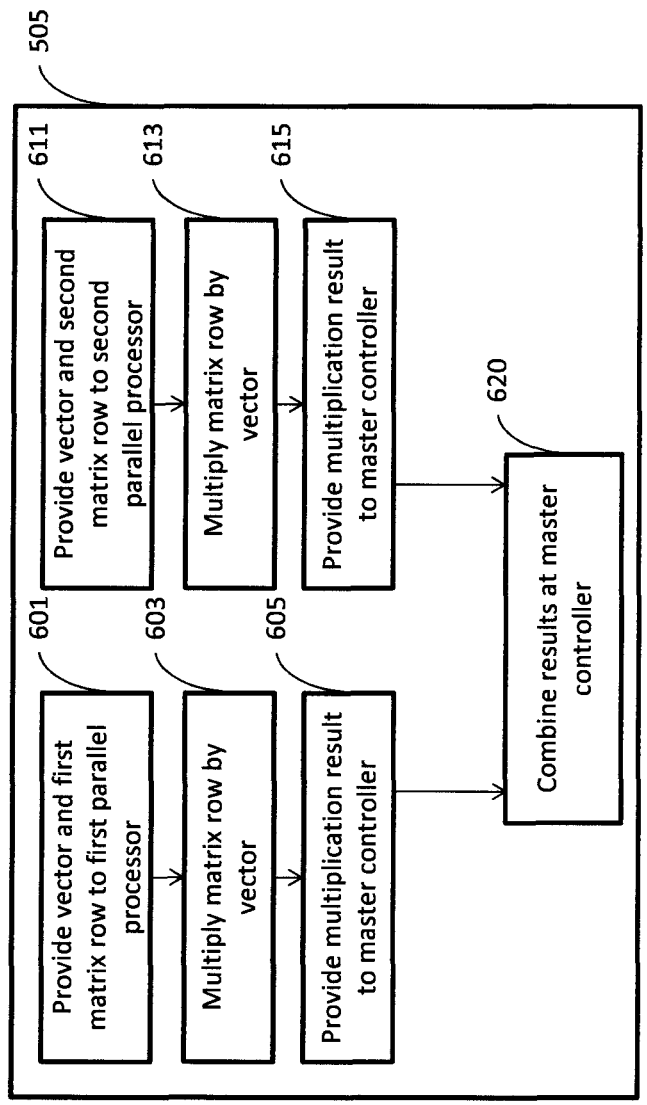

Further details of block 505 are now discussed with reference to the flow chart of FIG. 6. The fact that the graph of data elements is represented by a matrix allows the process to leverage parallel processing techniques to achieve significant speedup of the operation. Conceptually, multiplying an n×n matrix by a vector of length n comprises performing n separate vector multiplications, where each row of the matrix is treated as an n-long vector. Each of these multiplications can be performed on a processor independent of each of the other multiplications. At block 601, the frontier vector is provided to a first parallel processor together with a row of the matrix. In parallel, at block 611, the frontier vector is also provided to a second parallel processor, in this case, together with a different row of the matrix. The calculations can continue in parallel, with the first processor multiplying its row of the matrix by the frontier vector at block 603, and with the second processor multiplying its different row of the matrix by the frontier vector at block 613. The result of each multiplication will be a constant value. In embodiments where the matrix and vector are limited to binary elements, the result will specifically be either '0' or '1'. Continuing in parallel, at blocks 605 and 615, the first processor and second processor will return the first result and the second result, respectively. The results may then be received by the master controller, and at block 620, the master controller combines the results into a new vector for subsequent processing. While only two parallel processes are illustrated here, those of skill in the art will appreciate that this process can be performed with an arbitrary number of parallel processors, and that each row of the matrix will be processed by a processor.

Process 500 continues at block 507, where the counter is incremented and the tracking array is updated. The tracking array is updated to exclude from further expansion those nodes of the graph corresponding to each element that was expanded at the present level, while carrying forward those exclusions that were recorded at any previous iterations, as well. Specifically, each non-zero element of the frontier vector that was used in the most recent multiplication corresponds to a column and row that will be excluded going forward. Having updated the counter and tracking array accordingly, the process returns to block 505 if the search is to continue. If the most recent expansion discovered the target element that was being sought, or if there are no more elements to be expanded (i.e., the matrix is reduced to a minimum dimension), the search can be concluded.

The process then proceeds to block 509, where a logical pathway is constructed based on the tracking array. Having completed the search, either discovering the target element or determining that it could not be found within the desired search area, the process now can use the data that was recorded at the successive steps of the tracking array to identify the path(s) followed. As an illustrative example, the information in the successive result vectors shown in element 330 of FIG. 3D would correspond to information stored in the tracking array for that process. One can trace the shortest-path for a vertex by identifying it in a vector in 330, identifying a non-zero element in the preceding vector in 330 that is also contained in the row or column vector for that vertex in the full matrix, then repeating from such a non-zero element which is a predecessor of that vertex in the shortest-path until all predecessors are identified.

Embodiments have thus been disclosed for optimizing for fastest time of operation in a search, by effectively implementing a method of eliminating redundant operations on previously visited nodes in a graph, while simultaneously allowing for effective parallelization of costly computational operations. As will be explained in greater detail below, further embodiments may also be provided to optimize for space requirements. In some cases, the data set to be processed is sufficiently large that it becomes impractical or impossible to store the entire graph in a local memory. When this happens, random access to the graph becomes impractical, as well. Instead, the graph must be provided elsewhere, such as in a persistent storage (e.g., database) having high time cost for access. Efficient approaches will thus process the graph in a streaming fashion, such that it is not assumed to be possible for the processor(s) to retrieve streaming data a second time once it has already been received and processed once.

According to an embodiment of the present invention, a search may be executed across a data set using a sliding approach. Nodes are traversed and expanded in a stateless, level by level fashion by distance evaluation, and can be implemented with flexible memory requirements.

A number of shortcomings have been observed in prior art approaches. For example, when traversing a graph, a globally-shared data structure may be maintained to identify previously visited vertices. But such a globally-shared data structure requires memory on order of the number of vertices, $O(n)$, which can be prohibitive in large graphs. Furthermore, in parallel computation all updates to this data structure must be synchronized to ensure consistency. Some approaches have also required performing sorting of nodes, which may include on-disk sorting, requiring many slow disk accesses. This may be required, for example, as a method of removing duplicate entries. Additionally, not all approaches are equally well-suited for parallelization. Prior art approaches may include performing comparisons of vertices based on the ID values of the vertices. This can be expensive in terms of compute time, e.g., if the ID data type is a long string.

By comparison, the methods described herein can perform node comparisons by comparing distances, where the distances are integers with a maximum value being the diameter of the graph—which is rarely a large number. The distance comparison can be implemented as a fast comparison between integers. Since only integer distances are compared the vertices can be stored in any data type including strings. Further advantages of the presently disclosed methods include facilitating parallel computation without globally shared state and synchronization. A vertex is independently tested for expansion by evaluating only the distances at which that vertex was encountered. Therefore the work to identify which vertices should be visited can be performed in parallel without globally-shared information by distributing the distances per vertex.

Figure 4:
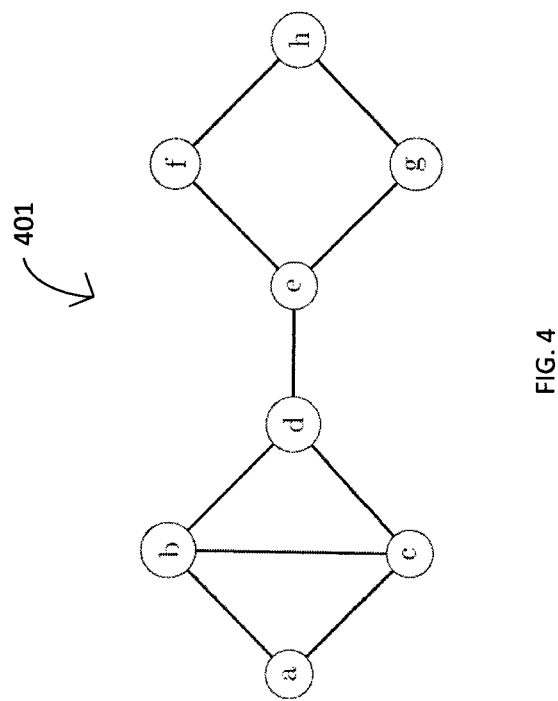
FIG. 4 is a diagram showing a graph of connected data elements.

In an undirected graph each vertex will be rediscovered when its neighbors are visited. At most, the discovery cycle is of length two from symmetry since a vertex is reflected as both ancestor and descendant with each neighbor. FIG. 4 shows an undirected graph with n=8 vertices and m=10 edges where the bidirectional edges, present in Table 1, are grouped by the k distances from vertex, a, the origin of traversal.

TABLE 1

| $k_1$ | $k_2$ | $k_3$ | $k_4$ | $k_5$ | $k_6$ |
|---|---|---|---|---|---|
| (a, b) | (b, a) | (c, a) | (d, b) | (e, d) | (f, e) | (g, e) | (h, f) |
| (a, c) | (b, c) | (c, b) | (d, c) | (e, f) | | (f, h) | (g, h) | (h, g) |
| | (b, d) | (c, d) | (d, e) | (e, g) | | | |

As Table 1 demonstrates, every vertex which first occurs as the destination endpoint of an edge will recur as the destination endpoint of an edge within at most two levels.

Processes disclosed herein may include creation of distance records for every vertex, but may process only a subset of the distance records at each level of the traversal to generate the next level without retracing, i.e. it uses a "sliding window" over the levels of input in the graph. The processes may proceed by evaluating all distances at which each vertex has been encountered to determine if the neighborhood of that vertex should be expanded (i.e. visit the vertex, after which the distance information for that vertex can be ignored). The distance records can be distributed by vertex and then the evaluation for neighborhood expansion can be performed independently and simultaneously without global state and synchronization.

Figure 7:
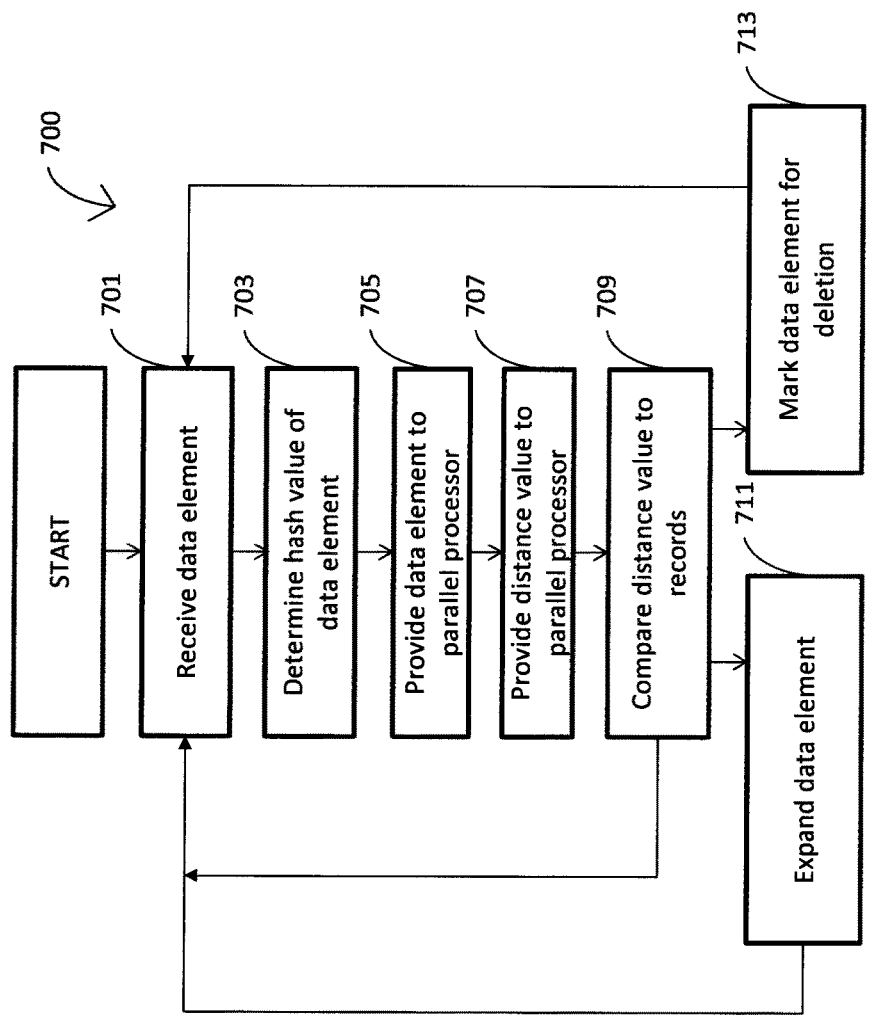

A process in accordance with an embodiment of the present invention is now described with reference to FIG. 7. FIG. 7 is a flow chart illustrating the process 700. The process 700 begins at block 701, where a data element is received at a master controller. While the present description of process 700 primarily discusses the processing of a single data element, as will be seen, process 700 may be performed for many different data elements during a single level of graph expansion. In some cases, these elements may be processed sequentially at the master controller, while in other cases, aspects of process 700, including those aspects not explicitly identified as parallel, may be performed using parallel processing according to techniques that may be understood by those of skill in the art.

The data element is maintained as part of a distance record. When a new search begins, the first data element that is traversed is considered a root node, and thus a distance record for this data element will include the distance "0." As data elements are expanded and new elements are encountered, each of those newly encountered elements are also maintained as part of distance records, as is discussed in more detail below. After an initial iteration based on a root node, data elements are received based on the expansion operation that will be discussed below, as well as by distance records being returned from parallel processors whenever they are not marked for deletion. It is significant to note that particular data elements will be encountered more than once during traversal of a graph, and each encounter results in a unique distance record. An important recognition is that most data elements will be encountered at least twice, and that the distances associated with those data elements will differ based on when and where they are encountered.

The process 700 continues at block 703, where a hash value is determined for the data element that was received at block 701. The hash value may be determined at the master controller according to various hashing techniques. The value that is hashed may be any value that uniquely identifies the node in question. For example, in an application where nodes represent people, the unique name string may be hashed. Alternatively, a unique database entry identifier may be hashed. In yet further cases, the database ID can itself be a pre-computed hash value, in which case determining the hash value would merely involve acquiring this field.

The process 700 continues at block 705, where the data element is provided to a processor for potential expansion. The master controller may provide the data element via an IPC network to one of a plurality of parallel processors based on the hash value. As a simplified example, if there were two parallel processors to choose from, one possible scheme would be to provide all elements having an even hash value to a first of the two processors, while providing all elements having an odd hash value to a second of the two processors. It is significant that the hash value determines the destination processor unambiguously, because multiple distance records are generated for individual data elements, and for any particular data element to be processed correctly, all existing distance records relating to that data element should be considered during the same process at one particular processor. Additionally, it is possible for the hash function and mapping to processors to change during processing, so long as the process for updating the mapping relationships is deterministic. So long as all existing distance records for a particular data element are maintained in a common location, they may be, e.g., sent back to the master controller after one round of calculation, consolidated with any new distance records that may have been created by other expansion processes, and then sent to a different processor for handling at the next round. Accordingly, the presently described methods may be robust against failure of individual computation nodes in a massively-parallel computing architecture.

The process 700 continues at block 707, where a distance value is provided to the parallel processor. While this block is shown in FIG. 7 as being executed after block 705, these values may be provided in any order, or simultaneously. As was noted above, each data element is stored as one or more distance records, including both the data element itself, as well as a distance value indicating how many "hops" or iterations have occurred from the root node to the present encounter of the data element.

The process 700 continues at block 709, where the parallel processor, in receipt of the distance record including the data element and its associated distance value, compares the distance record to the other distance records that have been provided for the present iteration. If there are no other distance records for the data element, or if all the distance records for the element have the same distance value, it can be concluded that the present node has not yet been traversed and expanded. Rather, it is being encountered for the first time, provided as a result of one or more other nodes being expanded.

Figure 8:
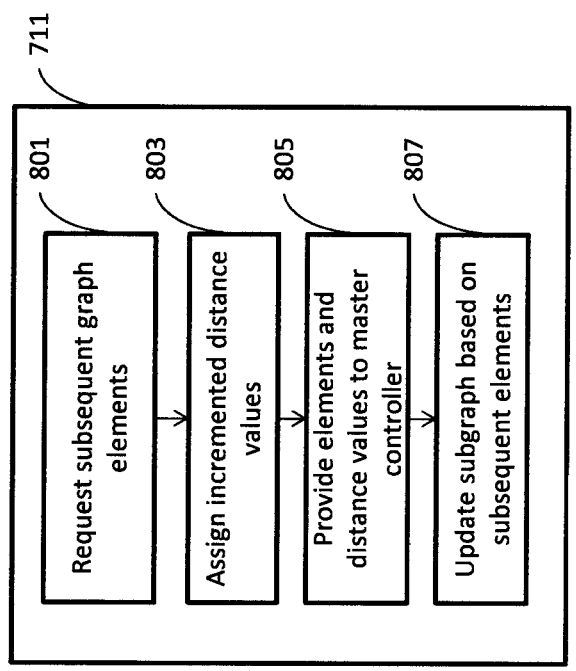

In this case, the process 700 then continues at block 711, where the data element is expanded. Block 711 is discussed with reference to FIG. 8, which shows further details of this block. At block 801, element expansion begins with the request of subsequent graph elements. The subsequent graph elements may be received from a database, data stream, etc. The process continues at block 803 where distance records are created with the assignment of distance values to each of the subsequent graph elements that was received at block 801. The distance values assigned at this block are one greater than the previous distance value in the distance record of the element under expansion. The process continues at block 805, where the elements and distance values are returned to the master controller. Having completed expansion of the node, the new distance records are returned to the master controller, which will continue iteratively processing the records in accordance with process 700, returning to block 701. It is significant to note that at block 805 both new distance records for the subsequent graph elements received at block 801 and a previously received distance record for the data element are returned. While the current element being processed may potentially have many distance records that were generated and processed, it is now unnecessary to retain and return more than one of these to identify that the element has been encountered.

Distance records are not discarded until they are positively identified as ready for deletion, as will be discussed below. The process continues at block 807, where a subgraph is updated based on the subsequent elements that were received at block 801. While this block is shown as following blocks 803 and 805, block 807 also may be performed prior to, or simultaneously with execution of block 803 and 805. The subgraph may be stored in a persistent storage medium, and in embodiments where a potentially comprehensive search is to be performed over an extremely large graph that will not fit in memory, this may be necessary. The subgraph operates as a record of the specific paths that are explored during the search through the graph. In some applications, creation of subgraphs may be used to identify connected components within a large graph. In some applications, the subgraph also may be used to identify a shortest path between a root node and a target node.

With further reference to block 709, in the event that two distance records for the same element have distance values that differ by two, the process continues at block 713, where the data element is marked for deletion. This information may be returned to the master controller to manage the disposal of these now unnecessary records. On a filesystem the deletion operation is more expensive than a move operation, and so the master controller may move these discarded records to a trash directory which can then be deleted at a later time that minimizes resource contention. Alternatively, the present parallel processor may merely maintain local records showing that the element has been marked for deletion and delete the records at a time when resources are available. Once the node has been deleted after two hops from initial expansion, there is no longer any worry that future graph traversal will revisit it, so long as all nodes are deleted in a timely fashion according to the presently described methods.

Traversal of a graph may in some cases also result in comparisons at block 709 that do not call for proceeding to either block 711 or block 713. In some cases, distance records may differ, but only by one, and not by two. While every node that is traversed will generate a pair of distance records with distances differing by two, corresponding at least to when the node is discovered, and when subsequent nodes rediscover it. For a difference of one to arise, however, the node must be discovered by expansion of a separate node, which itself was first discovered during the same iteration as the present node was discovered. A simple example may be seen in FIG. 4. Beginning a search from root node "a," nodes "b" and "c" both are discovered initially at distance 1, when node "a" is expanded. They also will be rediscovered two steps later at distance 3, after first expanding to "d," and then being rediscovered when "d" is expanded. However, when "b" is expanded, it not only discovers "d" at distance 2, but it also discovers "c" at distance 2. Similarly, when "c" is expanded, "b" is discovered at distance 2. Upon receiving these non-matching distance records, it is clear that nodes "b" and "c" do not need to be expanded again, because this would perform unnecessary duplicative operations. However, they also cannot be deleted yet, because they will be rediscovered at a subsequent step, and records must be maintained to prevent them from being expanded repeatedly in the future. In such a situation, a single distance record may simply be returned to the master controller without any further processing.

The distance comparison at any of the parallel processors does not require internal memory beyond what is needed to compare two distance values. If the distances for a data element at a processor are stored on the local disk of that processor, then comparison can proceed by reading the first distance and storing it in local memory such as a register of the CPU on the parallel processor, and then streaming the remaining distances one at a time into a second location in memory where it can be compared.

Depending on the embodiment, certain acts, events, or functions of any of the methods described herein can be performed in a different sequence, can be added, merged, or left out altogether. Not all described acts or events are necessarily required for the practice of any claimed method. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

I claim:

1. A computer-implemented method of constructing a logical pathway between an initial search frontier and a target data element in an undirected graph of data elements, in a system comprising 1) a plurality of parallel processors each having a local memory, 2) an inter-processor communication (IPC) network, and 3) a master controller having a local memory and logically coupled to the plurality of parallel processors via the IPC network, the method comprising:

receiving, at the master controller in the local memory, a data structure defining a symmetric matrix having size n×n, wherein the value of each matrix element corresponds to one of 1) a presence of, and 2) an absence of, an undirected edge between a pair of data elements in the graph of data elements defined by a row and a column of the matrix element;

receiving, at the master controller in the local memory, a first vector of length n, wherein the value of each element in the vector corresponds to one of 1) a presence of, and 2) an absence of, a data element of the graph of data elements in the initial search frontier;

at the master controller in the local memory, initializing 1) a counter variable and 2) a tracking array, wherein the tracking array contains array elements that are configured to track dimensionality reduction parameters for the matrix;

repeatedly performing the operations of:

multiplying a subset of the matrix defined by the array element corresponding to the counter variable, by a subset of the first vector defined by the array element corresponding to the counter variable, to generate a second vector corresponding to an updated search frontier corresponding to the counter variable, wherein multiplying the subset of the matrix by the subset of the first vector comprises:

providing, from the master controller via the IPC network to a first processor of the plurality of parallel processors, the first vector and at least one first portion of the matrix;

at the first processor in the first processor's local memory, multiplying the first vector by the at least one first portion of the matrix to produce a first result;

providing, from the first processor via the IPC network to the master controller, the first result;

providing, from the master controller via the IPC network to a second processor of the plurality of parallel processors, the first vector and at least one second portion of the matrix;

at the second processor in the second processor's local memory, multiplying the first vector by the at least one second portion of the matrix to produce a second result;

providing, from the second processor via the IPC network to the master controller, the second result; and combining, at the master controller in the local memory, the first result and the second result to generate the second vector corresponding to the updated search frontier;

incrementing the counter variable;

updating the first vector based on the updated search frontier; and updating an array element in the tracking array corresponding to the counter variable based on the non-zero values of the first vector, such that the updated array element corresponds to a larger dimensionality reduction of the matrix than the previously used array element;

until 1) the updated search frontier contains a non-zero element corresponding to the target data element, or 2) the matrix is reduced to a minimum dimension; and constructing the logical pathway based on the tracking array.

2. A method in accordance with claim 1, wherein the data structure defining a symmetric matrix comprises a compressed sparse row representation.

3. A method in accordance with claim 1, wherein the symmetric matrix is a binary matrix.

4. A method in accordance with claim 1, wherein the first portion of the matrix and the second portion of the matrix comprise a first row of the matrix and a second row of the matrix.

5. A computer-implemented method of constructing a subgraph of an undirected graph of data elements based on a target data element in the graph, in a system comprising 1) an inter-processor communication (IPC) network, 2) a plurality of parallel processors each having a local memory and logically coupled to the IPC network, 3) a master controller having a local memory and logically coupled to the IPC network, and 4) at least one persistent physical storage system logically coupled to the IPC network, the method comprising:

repeatedly updating the subgraph, until the subgraph is updated based on the target data element, by:

1) receiving, at the master controller in the local memory, a received data element of the graph;

2) determining, at the master controller, a hash value of the received data element;

3) providing the received data element via the IPC network to a parallel processor of the plurality of parallel processors, wherein the parallel processor is selected based on the hash value;

4) providing a provided distance value associated with the received data element, via the IPC network to the parallel processor;

5) determining, at the parallel processor, whether the provided distance value associated with the received data element is two more than at least one previously observed distance value associated with the received data element;

6) in the event the provided distance value does not differ from any previously observed distance value associated with the received data element, processing the received data element by performing an element expansion operation, the element expansion operation comprising:

requesting, from the at least one persistent physical storage system, at least one subsequent element of the undirected graph based on the received data element;

associating a subsequent distance value with the at least one subsequent element, the subsequent distance value being one greater than the provided distance value associated with the received data element;

providing the at least one subsequent element of the undirected graph and its associated subsequent distance value, as well as the received data element and its associated provided distance value to the master controller via the IPC network; and updating the subgraph, at the at least one persistent physical storage system, based on the at least one subsequent element; and 7) in the event the provided distance value is two more than at least one previously observed distance value associated with the received data element, marking the received data element for deletion from the subgraph.

* * * * *